Patented Sept. 12, 1939

2,172,418

UNITED STATES PATENT OFFICE 2,172,418

SEPARATING REFRIGERANT FROM FROZEN FOODS

Robert B. Taylor, near Knoxville, Tenn., assignor to Tennessee Valley Authority, Wilson Dam, Ala., a corporation of the United States No Drawing. Application July 7, 1938, Serial No. 217,973

4 Claims. (Cl. 99—198)

(Granted under the act of March 3, 1883, as amended April 30, 1928; 370 O. G. 757)

The invention herein described may be manufactured and used by or for the Government for governmental purposes without the payment to me of any royalty thereon.

This invention relates to a method for the freezing of foods and is particularly directed to an improved method of quickly freezing foods by direct contact with a liquid refrigerant maintained at a temperature substantially below the freezing point of the food.

A principal object of the invention is to effect an improvement in the condition and keeping qualities of foods frozen by direct contact with a refrigerant medium.

It has previously been proposed to freeze foods, including fruits, meats and vegetables, by direct contact with a liquid refrigerant medium. I have described in application Serial No. 91,442, filed July 18, 1936, a particularly efficient and successful method for the quick freezing of foods which comprises directly contacting the food, preferably in the form of units having at least one dimension which does not exceed about one inch, with an aqueous solution which has a freezing point not higher than 0° F. and low viscosities at 0° to 10° F. and which is suitable for use in direct contact with foods, maintaining the temperature of the solution between the temperature at which the food may be safely stored and a temperature substantially below the freezing point of the food, and circulating the solution over the food at such a rate that the temperature of the solution adjacent the food remains below the freezing point of the food. Particularly advantageous refrigerant solutions are provided by aqueous solutions of invert sugar which may, in general, be used for the freezing of all types of foods, including fruits, vegetables and meats. Aqueous solutions of salts, particularly sodium chloride, may also be used, especially for the freezing of vegetables and meats.

I have now found that the condition, appearance and keeping qualities of foods frozen by this process and by other processes involving direct contact of an aqueous solution with the food may be very substantially improved by providing means for the positive removal of substantially all of the refrigerant medium from the food after it has been frozen.

I have found that when food which has been frozen by direct contact with an aqueous solution is placed in storage with the amount of solution thereon which is left by merely draining the frozen food, the food, particularly in the surface layers thereof, tends to soften and to lose its natural appearance. This effect appears to be due to osmotic interaction of the retained solution with the frozen juices or liquid constituents of the food. The liquid having a higher osmotic pressure than the food juices, since it necessarily has a lower freezing point, progressively withdraws water therefrom, or transfers solutes thereto, or both, until an equilibrium is reached. With the amounts of solution left on the food by drainage removal alone at or before the attainment of equilibrium, the composition of the food juice in the outer layers of the food becomes so altered that its freezing point is lower than the normal temperature of storage. The surface of the food thereby becomes softened and the appearance and keeping qualities of the food very substantially deteriorate.

I have found that this disadvantage may be overcome by positively removing from the food so much of the refrigerant solution that even after the residual solution has attained complete osmotic equilibrium with the food juice, the composition of the food juice remains such that it is well below its freezing point under standard storage conditions, for example, at 0° F. The composition of the small residual amount of refrigerant solution may thereby be so altered that it is no longer liquid at the temperature of storage and it may therefore freeze which further improves the appearance of the frozen food.

A particularly advantageous method of removing the refrigerant solution from the food after the freezing operation is by subjecting the frozen food promptly to the action of centrifugal force, which rapidly and effectively removes the adherent solution to the necessary degree to avoid the disadvantages described above.

The following is an illustrative example of the method of the invention.

Whole suitably prepared fresh strawberries were immersed in an aqueous solution of invert sugar in an insulated chamber. The solution contained 57% by weight of invert sugar and had a freezing point of 0° F. and a viscosity of approximately 400 centipoises at 8° F. The temperature of the solution was maintained at about 5° F. by means of a suitable refrigerating device and the solution was circulated over the strawberries at such a rate that the rise in temperature of the solution in passing over the strawberries was less than 1° F. The berries were completely frozen in 5 to 6 minutes. The frozen strawberries were then removed from the invert sugar and were subjected to centrifugal force equivalent to about 75 times gravity for about 40 seconds.

The strawberries were then placed in storage at 0° F. Their surface portions remained frozen and the berries maintained their natural appearance and their excellent keeping qualities even after several months' storage at this temperature.

Similar advantageous results are obtained with other fruits, and with vegetables and meats which have been frozen by contact with sodium chloride solutions.

In general, the subjection of the frozen foods to centrifugal force equivalent to upwards of 25 times gravity for at least 30 seconds is sufficient to reduce the amount of adherent refrigerant solution to such an extent that the foods can be stored at 0° F. for several months or more without any apparent deterioration in appearance or keeping qualities. The amount of such refrigerant solution left on the food should not exceed five percent by weight of the food product and should preferably be of the order of one percent by weight of the food product.

I claim:

1. In the freezing of foods by direct contact thereof with an aqueous refrigerant solution, the step which comprises positively removing from the frozen food, after the freezing operation, so much of the adherent refrigerant solution that the residual solution is insufficient in amount to lower the freezing point of the food juices in the surface layers to the temperature at which the frozen food is to be stored.

2. In the freezing of foods by direct contact thereof with an aqueous refrigerant solution, the step which comprises positively removing from the frozen food, after the freezing operation, so much of the adherent refrigerant solution that the residual solution is insufficient in amount to lower the freezing point of the food juices in the surface layers to 0° F.

3. In the freezing of foods by direct contact thereof with an aqueous refrigerant solution, the step which comprises removing from the frozen food, by subjecting the food to centrifugal force after the freezing operation, so much of the adherent refrigerant solution that the residual solution is insufficient in amount to lower the freezing point of the food juices in the surface layers to the temperature at which the frozen food is to be stored.

4. In the freezing of foods by direct contact thereof with an aqueous refrigerant solution, the step which comprises removing from the frozen food, by subjecting the food to centrifugal force after the freezing operation, so much of the adherent refrigerant solution that the residual solution is insufficient in amount to lower the freezing point of the food juices in the surface layers to 0° F.

ROBERT B. TAYLOR.